(12) United States Patent
Southworth (10) Patent No.: US 8,100,227 B2
(45) Date of Patent: Jan. 24, 2012

(54) PORTABLE WORKER SAFETY FRAME

(75) Inventor: Patrick Southworth, Lewistown, MT (US)

(73) Assignee: Jim-N-I, Inc., Lewistown, MT (US)

( * ) Notice: Subject to any disclaimer, the term of this patent is extended or adjusted under 35 U.S.C. 154(b) by 526 days.

(21) Appl. No.: 12/170,969

(22) Filed: Jul. 10, 2008

(65) Prior Publication Data

US 2010/0006375 A1 Jan. 14, 2010

(51) Int. Cl.
*E04G 1/00* (2006.01)
(52) U.S. Cl. ............. 182/130; 182/131; 182/3; 212/195
(58) Field of Classification Search .................. 182/148, 182/130–132, 222, 141, 3; 212/346, 195; 296/100.01
See application file for complete search history.

(56) References Cited

U.S. PATENT DOCUMENTS

| | | | | |
|---|---|---|---|---|
| 3,302,751 | A * | 2/1967 | Ahlberg | 182/118 |
| 4,456,093 | A * | 6/1984 | Finley et al. | 182/2.2 |
| 5,392,878 | A * | 2/1995 | Bennett et al. | 182/115 |
| 2004/0026170 | A1* | 2/2004 | Rudolph | 182/141 |

* cited by examiner

*Primary Examiner* — Katherine W Mitchell
*Assistant Examiner* — Daniel Cahn
(74) *Attorney, Agent, or Firm* — Paul W. Mitchell (57) ABSTRACT

A portable worker safety frame provides many of the benefits of a loading dock while enhancing worker safety. In one implementation, the safety frame provides a walking surface of adjustable height that may be placed adjacent to an arbitrary work surface of a transportation vehicle. The safety frame can provide a walking platform that has a similar length as the cargo bed itself, yet is portable by such conventional means as the forks of a lift truck. The portable worker safety frame also provides an overhead safety rail to which each worker may attach a safety harness cord.

3 Claims, 9 Drawing Sheets

PORTABLE WORKER SAFETY FRAME

TECHNICAL FIELD

The subject matter presented herein relates generally to loading and securing cargo on vehicles of transportation, and more particularly to a portable worker safety frame.

BACKGROUND

Loading and securing cargo on hauling vehicles, such as flatbed trailers of semi-trucks can be hazardous for human workers. Statistically, getting onto the cargo bed of a hauling vehicle via built-in or separate ladders or steps causes a certain percentage of slips and falls. As the cargo bed fills up, there is less room for workers, for the workers' tools, and for materials for securing the load, such as tarps, wraps, and banding supplies. Less room on the cargo bed increases the chances of falling off the edge of the working surface. Besides falling down or falling off the edge of the hauling vehicle, workers can also fall off the cargo itself, while it is being fastened to the cargo bed. When securing a load with straps and bands, the straps and bands often fasten to the side of the vehicle's bed, necessitating a work position off to the side of the hauling vehicle.

Loading docks and fixed worker platforms provide a safe surface for accessing a hauling vehicle's cargo bed, but are generally expensive to build and cannot be moved. Thus, long flatbed trailers must maneuver to the side of a fixed platform, which may not be the same height as the actual work surface of the trailer. Since fixed platforms and loading docks are permanently anchored in the ground with cement and/or bolted to a building, they cannot be transported to a position where the hauling vehicle may be conveniently parked. Rather, the vehicle must be brought to the conventional fixed platform.

SUMMARY

A portable worker safety frame provides many of the benefits of a loading dock or fixed platform while enhancing worker safety. In one implementation, the safety frame provides a walking surface of adjustable height that may be placed adjacent to an arbitrary work surface, such as the cargo bed of a flatbed trailer, flatbed railroad car, or other transportation vehicle. The safety frame can provide a walking platform that has a similar length as the cargo bed itself, yet is portable by such conventional means as the fork of a lift truck. The portable worker safety frame also provides an overhead safety rail, which may be adjustable in height and horizontal displacement, to which each worker may attach a safety harness cord. The structure of the portable safety frame is designed to have a center of mass that allows lifting from one edge while also counterbalancing the weight of workers and loads when the safety frame is placed on the ground. The portable safety frame can accommodate additional built-in and moveable counterweights to stabilize the structure at various adjustable heights and horizontal displacements of the walking surface and the overhead safety rail.

Portable worker safety frames can improve product workflow and plant layout. Finished product can be stored in multiple places or spread out over a large area of the plant as the product to be loaded need not be moved to a conventional fixed loading structure. For shipping and workflow efficiency, a loading crew moves only the portable worker safety frame to the finished product being loaded onto a truck for shipment, rather than moving all the finished pieces to one fixed loading spot in the facility.

The portable worker safety frame gives a person on a truck a safe place to stand while the finished product is being loaded and also provides an escape route if the load collapses. Embodiments of the portable worker safety frame can hold multiple workers.

This summary section is not intended to give a full description of the portable worker safety frame, or to provide a list of features and elements. A detailed description of example embodiments of the portable worker safety frame follows.

DETAILED DESCRIPTION

Overview

This disclosure describes a portable worker safety frame. In its many implementations, the exemplary safety frame emulates immovable platform fixtures and loading docks that are permanently installed in the ground to provide a surface for human workers servicing a cargo load on the hauling bed of an adjacent transportation vehicle, such as a truck or train. The portable worker safety frames described herein provide comparable strength and stability as conventional immovable worker platforms and docks made primarily of concrete, anchored in the ground, and/or bolted to the side of a building. Examples of the innovative portable worker safety frame described herein derive strength and stability from their structure and in some cases from counterweight systems, and not primarily from a permanent attachment to ground or a building. Thus, the portable worker safety frames are easily movable with commonly available means, such as a forklift vehicle, a lightweight crane, or in some cases, a palette jack; or in a variation, by onboard means, such as wheels and motor.

Portable worker safety frames can improve product workflow and plant layout. For example, utilizing a portable worker safety frame allows a producer to store finished product in multiple areas of the plant or spread out over a large area. This is not cost effective with a conventional fixed loading structure, as the finished product to be loaded must eventually be moved to the usually narrow confines of the fixed loading structure.

From the standpoint of workflow efficiency, streamlining, and safety, a shipping crew that uses the portable worker safety frame moves only one item—the portable worker safety frame—near to the finished product that is being loaded onto a truck for shipment, rather than the other way around, in which all of the finished pieces must be moved from their place of manufacture to the one fixed loading spot in the facility.

Besides their portability, embodiments of the portable worker safety frame include additional desirable features, such as an overhead safety rail for harnessing workers in order to provide protection from falls. The portable worker safety frame gives a person on a truck a safe place to stand while the finished product is being loaded and also provides an escape route if the load collapses. Moreover, embodiments of the portable worker safety frame can hold multiple workers.

An exemplary portable worker safety frame may also exploit construction materials to provide even greater lightness than that provided by structural design alone, yet with comparable load strength. The lightness and strength are complemented by adjustability. Embodiments of the portable worker safety frame allow personnel to work up the load at various heights whereas a loading dock typically only allows a fixed work height of 4'-0" above a concrete floor.

The portable worker safety frame can be moved from the side of one vehicle to the side of a next vehicle within a facility, e.g., among numerous truck-and-trailer combinations, rather than having to jockey long trucks or other hauling vehicles to the fixed position of an immovable service platform. Further, a single instance of the portable worker safety frame can be moved to service multiple vehicles within a facility that has limited physical area, rather than having to move every vehicle or build multiple fixed docks to provide the same benefit. Being portable, the portable worker safety frame can also be moved between facilities. That is, in some implementations, the portable worker safety frame can itself be loaded on a transportation vehicle and transferred to another site.

Exemplary Portable Worker Safety Frames

Figure 1:
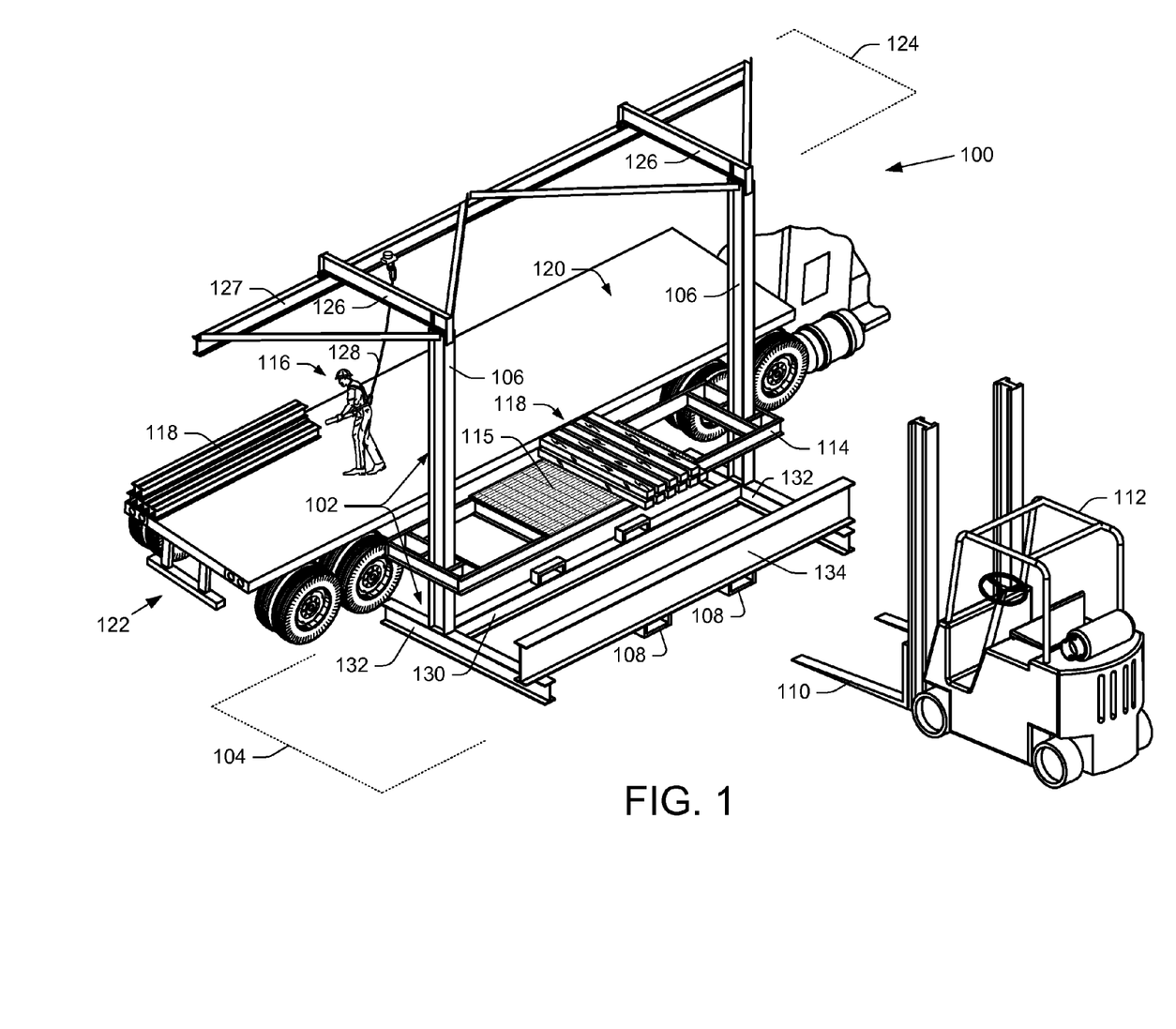
FIG. 1 is an elevation view of an exemplary portable worker safety frame in a truck-trailer loading setting.

FIG. 1 shows one implementation of the portable worker safety frame 100. A base assembly 102 ("stand") includes a base frame 104 for establishing a stable support of the entire safety frame 100 on a ground surface. The base assembly 102 also includes upright support members 106 secured to the base frame 104, and sleeves 108, at least some of which are secured near an edge of the base frame 104 for receiving the tines 110 of a lift truck 112, such as a forklift vehicle.

A walking platform 114 with walking surface 115 is secured to the upright support members 106, allowing human workers 116 to service cargo 118 being loaded on an arbitrary work surface 120 adjacent to the walking platform 114, such as the bed of a flatbed trailer 122. The length of the walking platform 114 and/or of the portable worker safety frame 100 can be comparable to the length of the flatbed trailer 122 or other arbitrary work surface 120.

An overhead safety rail assembly 124 is secured via horizontal members 126 to the upright support members 106. The overhead safety rail assembly 124 includes an overhead safety rail 127 that provides an attachment point for support harness cords 128 used by human workers 116 on the work surface 120.

In one implementation, the base frame 104 has a first longitudinal support member 130 and coplanar end members 132 to form an I-shaped support base or an H-shaped support base. Other implementations of the base frame 104 are described with respect to later Figures.

The illustrated portable worker safety frame 100 is built mainly of steel I-beams. Other construction materials may be used, however, such as aluminum or aluminum-magnesium alloys, for lighter weight. The walking surface 115 may be made of steel grate, expanded steel mesh, or other suitable materials, that preferably provide a sturdy, non-slip surface.

Besides longitudinal support member 130, a second "massive" longitudinal support member 134 is secured on the lifting side of the portable worker safety frame 100. The second longitudinal support member 134 adds structural integrity to the base frame 104 and is intentionally selected to have a high mass relative to its structural support function, in order to provide a counterweight for stabilizing the safety frame 100. The second longitudinal support member 134 counterbalances the walking platform 114 and the overhead safety rail assembly 124 when these are under load from cargo 118 and multiple workers 116.

Figure 2:
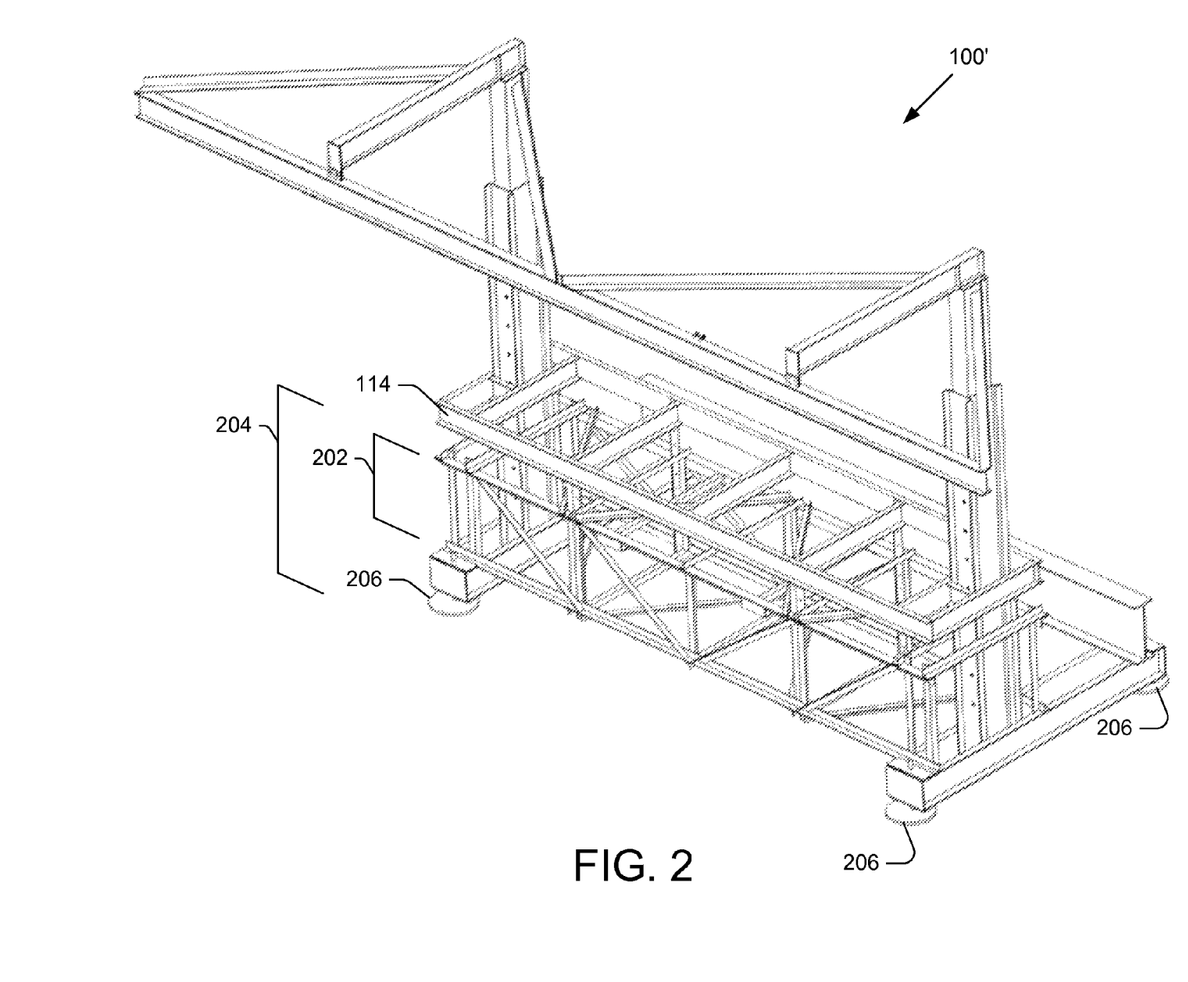
FIG. 2 is an elevation view of the exemplary portable worker safety frame in an embodiment that uses some built-up support members.

FIG. 2 shows another implementation of the portable worker safety frame 100'. The primary difference between the example safety frame 100 of FIG. 1 and the example safety frame 100' of FIG. 2 is that the first longitudinal support member 130 of the base frame 104 in FIG. 1 is formed of an I-beam, while the first longitudinal support member 202 in FIG. 2 is of a hollow, built-up beam construction. The structure of the base frame 204 in FIG. 2 can provide lighter weight of the entire safety frame 100' while providing comparable strength as the embodiment shown in FIG. 1.

In FIG. 2, the height of the walking platform 114 is adjustable. The height of the overhead safety rail 127 is also adjustable. Further, the horizontal position of the overhead safety rail 127 is also adjustable (not shown in FIG. 2) to accommodate arbitrary work surfaces of various widths.

The base frame 204 (or 104 in FIG. 1) may have adjustable feet 206 to level the portable worker safety frame 100' on an uneven ground surface.

Figure 3:
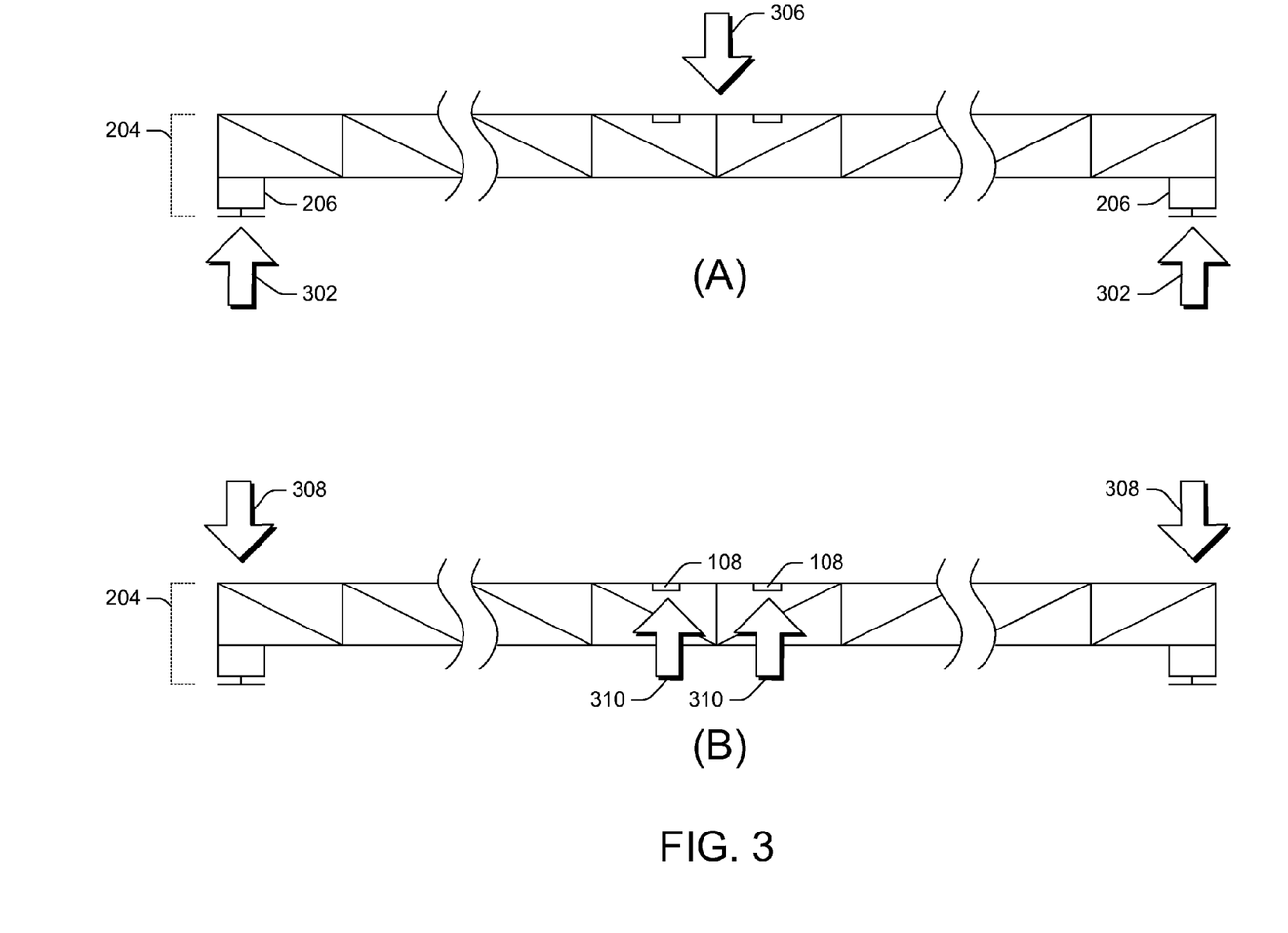
FIG. 3 is a front view of one embodiment of a base frame of the portable worker safety frame.

As shown in FIG. 3(A), when placed on a ground surface, the ground provides support 302 through the members contacting the ground or through adjustable feet 206 used with the base frame 204. The structure of the base frame 204, in turn, provides strength for supporting the weight 306 of workers 116 (such as in FIGS. 1 and 2, the workers 116 who may be on the walking platform 114 and workers 116 who may be attached to the overhead safety rail assembly 124). In FIG. 3(B), conversely, when the portable worker safety frame 100' is being lifted by the lift truck 112, the base frame 204 possesses a rigidity for maintaining the shape and structural integrity of the portable worker safety frame 100' along the span of its entire length when the safety frame structure 100' is supported only by the sleeves 108, i.e., when the support 310 for lifting the entire safety frame 100' is applied only at the lifting sleeves 108.

Figure 4:
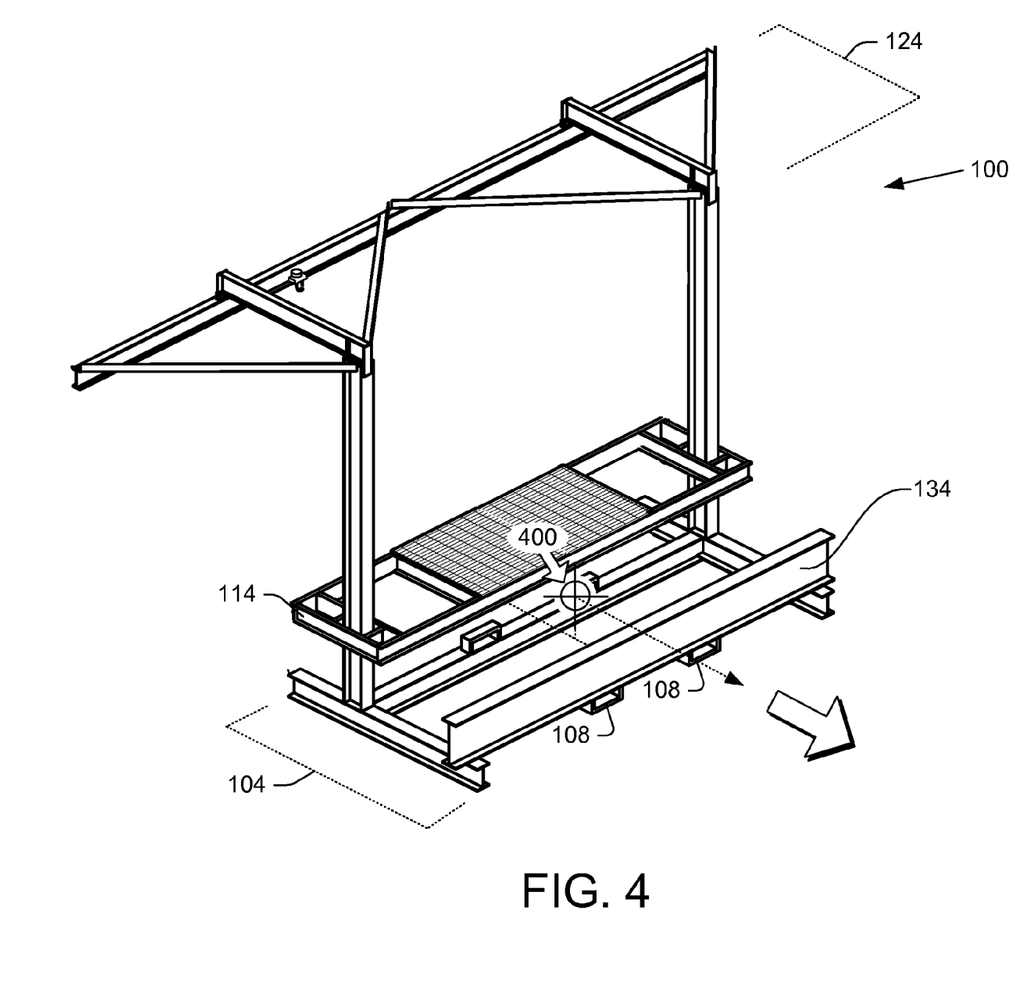
FIG. 4 is an elevation view showing the center of mass of an embodiment of the portable worker safety frame.

FIG. 4 depicts a center of mass 400 of one embodiment of the portable worker safety frame 100. The structural configuration of the portable safety frame 100 includes (or allows for) counterweight on the opposite side of the horizontal extension of the overhead safety rail assembly 124 and walking platform 114. For example, the massive longitudinal support member 134 is included in some embodiments to shift the center of mass 400 away from the horizontal extension of the overhead safety rail assembly 124 vehicle side of the walking platform 114. Having a structure in which the center of mass 400 is shifted in an opposite direction from weight-bearing horizontal extensions enables the base frame 104 to counterbalance the weight of a variable number of workers on the walking platform 114 who (potentially) may become a load on the overhead safety rail assembly 124. During a mishap, it is assumed that the overhead safety rail assembly 124 will potentially be bearing the weight of some or all workers 116 engaged on the portable worker safety frame 100.

From another perspective, the shifted center of mass 400 as just described, is also positioned nearer a lifting edge of the base frame 104, and centered between the sleeves 108, enabling some implementations of the portable worker safety frame 100 to be lifted more easily at the lifting edge, and also making it possible for very large implementations of the portable worker safety frame 100 that could not otherwise be reasonably handled, to be lifted by relatively small, standard forklift trucks. Thus, in one embodiment the portable worker safety frame 100 uses the massive longitudinal support member 134 to shift the center of mass 400 of the portable worker safety frame 100 toward the lifting side to assist transportation and provide counterbalance for safety.

Figure 5:
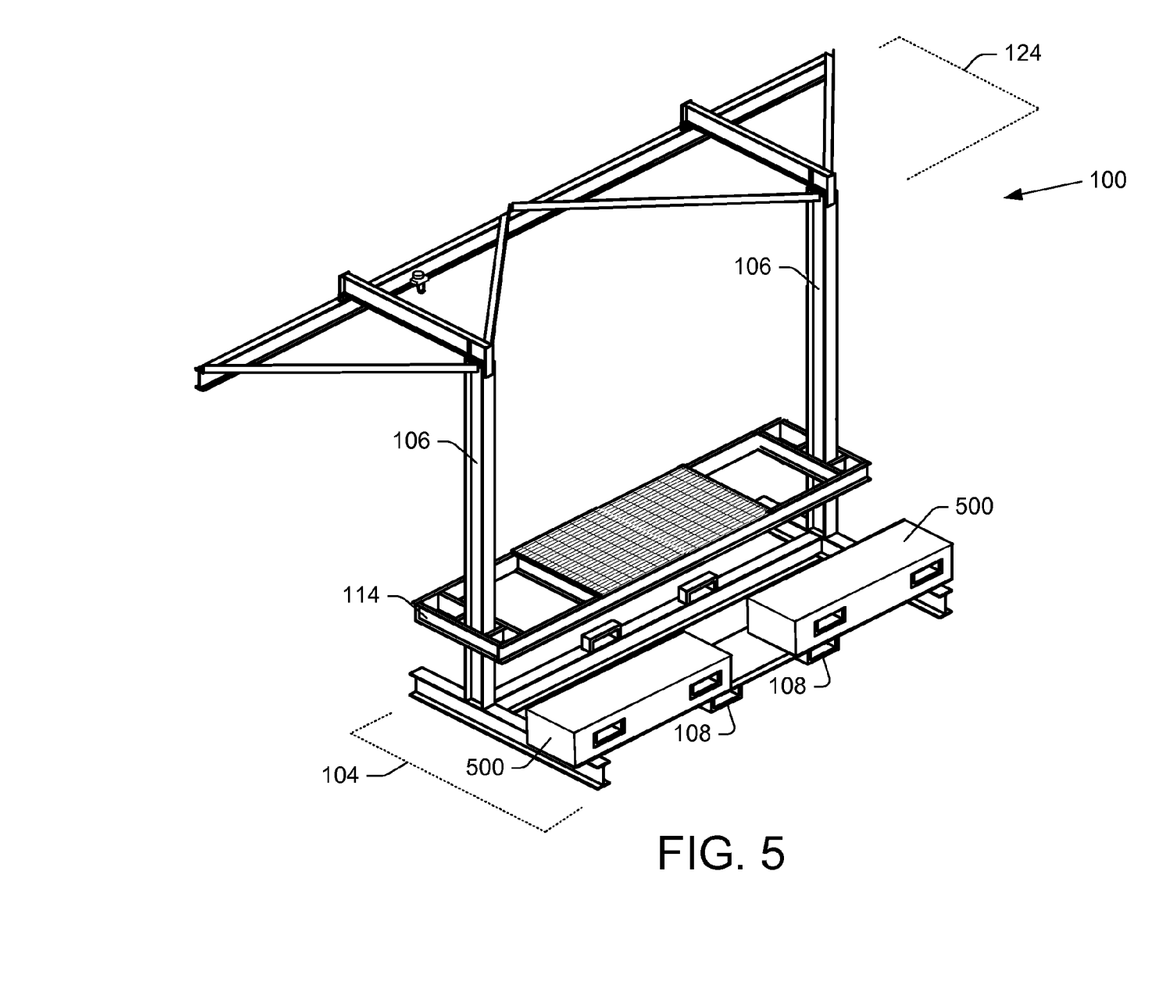
FIG. 5 is an elevation view of one embodiment of the portable worker safety frame and separate counterweights.

FIG. 5 shows another embodiment of the portable worker safety frame 100 that accepts portable counterweights 500 as an alternative to (or in addition to) the massive longitudinal support member 134 of other embodiments. The counterweights can be made of concrete, lead, zinc, gravel-filled containers, etc. In one implementation, a 400-500 kilogram (or half-ton) counterweight 500 is placed on the base frame 104 at each of two (or more) upright support members 106. When the particular embodiment of the portable worker safety frame 100 does not have an adjustable walking platform 114 or an adjustable overhead safety rail assembly 124 (i.e., when these are fixed) then fixed counterweights 500 of fixed mass can be used safely. In many implementations, counterweights 500 of such fixed size suffice. However, in larger implementations of the portable worker safety frame 100, or in implementations in which the walking platform 114 and the overhead safety rail assembly 124 are adjustable over a wide range of height and horizontal displacement settings, then variable counterweight schemes are employed, as described below.

Figure 6:
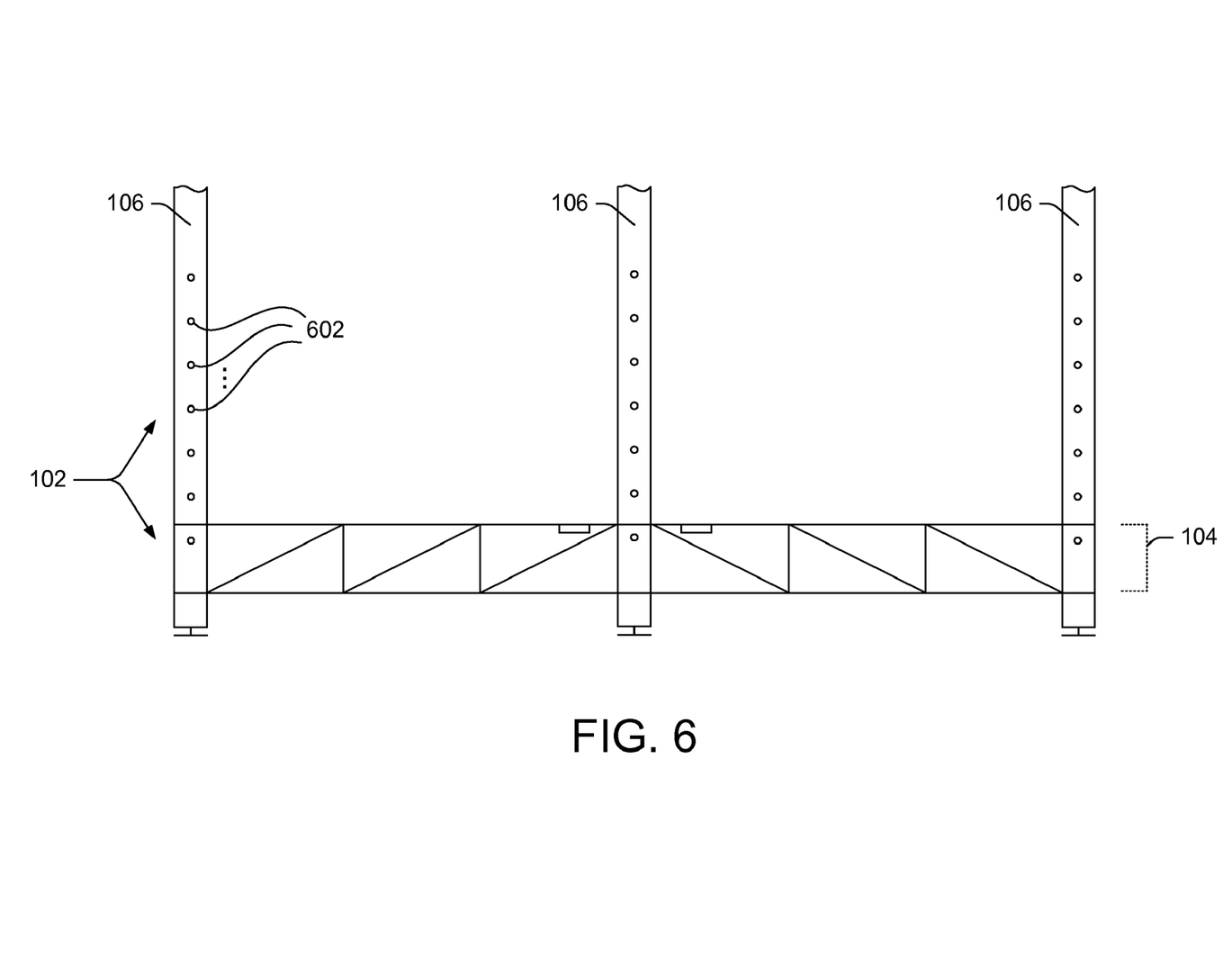
FIG. 6 is a front view of an embodiment of the base frame of the portable worker safety frame in which three upright support members provide adjustable height.

FIG. 6 shows an embodiment of the base assembly 102 in which three upright support members 106, instead of two, provide stability for a relatively long embodiment of the portable worker safety frame 100. In this embodiment, the upright support members 106 have multiple fastening positions 602 at which the walking platform 114 and the overhead safety rail assembly 124 can be temporarily secured, providing height adjustments for the walking platform 114 and/or the overhead safety rail assembly 124. For example, in one implementation, an upper part of the upright support member 106 may slide inside a lower part of the upright support member 106 to provide vertical adjustment, as shown in FIG. 2.

FIG. 7(A) shows an adjustable implementation of the portable worker safety frame 100 in an unexpanded state. FIG. 7(B) shows the portable worker safety frame 100 in an expanded state. In the illustration of FIG. 7(B), the darkened segments of the upright support members 106 and the darkened segment of the horizontal members 126 of the overhead safety rail assembly 124 show possible locations for sliding adjustments.

Figure 7:
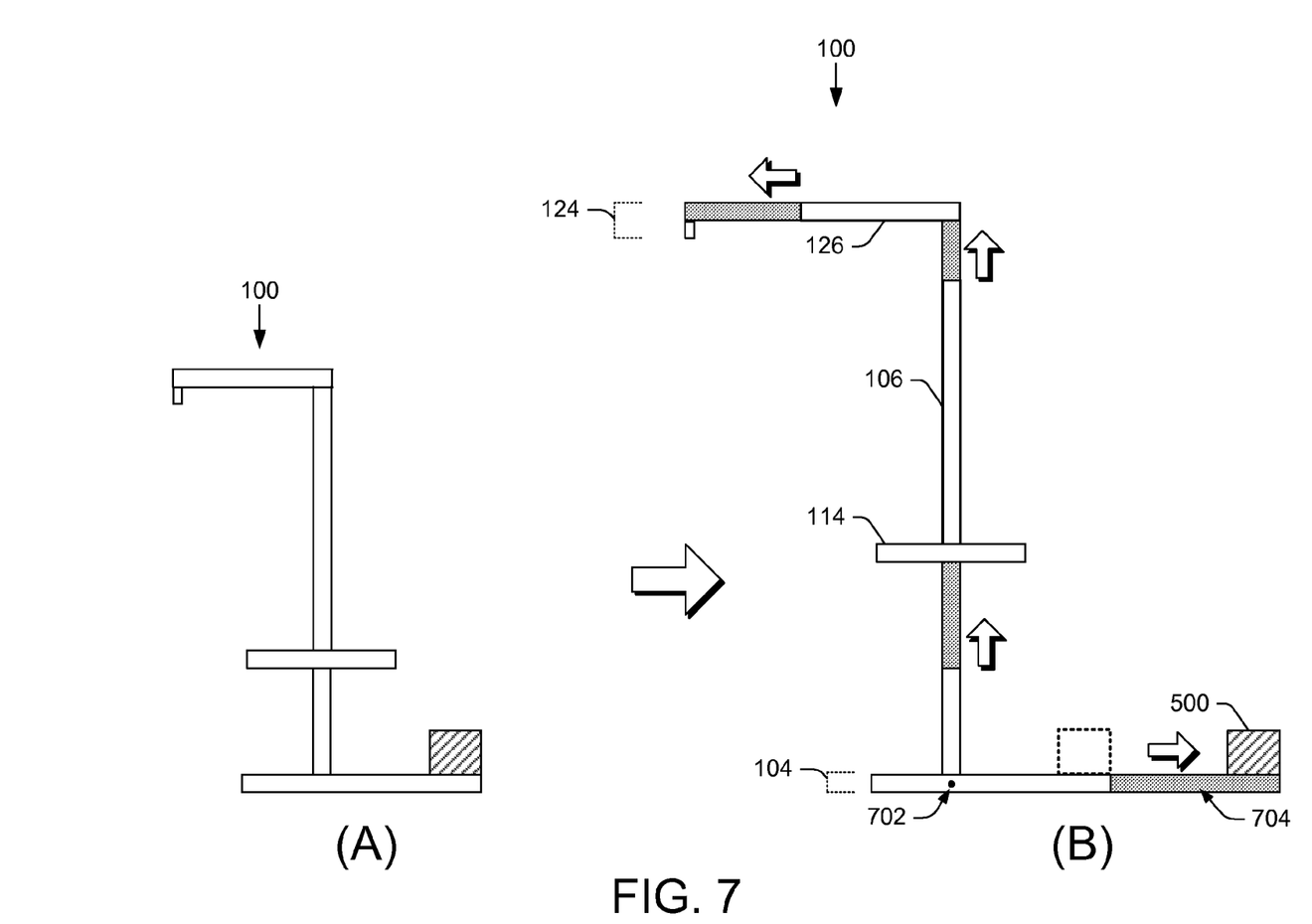
FIG. 7 is a side view of an extendible embodiment of the portable worker safety frame.

In some implementations, adjusting the height and/or the horizontal displacement of the walking platform 114 and the overhead safety rail assembly 124 can increase a tipping tendency of the portable worker safety frame 100. That is, extension of the upright support members 106 and the horizontal members 126 increases a torque force vector acting to rotate the portable worker safety frame 100 at the axis 702 where the upright support members 106 attach to the base frame 104. The magnitude of the torque vector depends on the weight of the workers, and any cargo load that may be temporarily on the walking platform 114, multiplied by the length of the lever arm radius (i.e., the extended length) of the upright support members 106. That is, in some embodiments, when the adjustments are extended and there are workers 116 and cargo 118 on the portable worker safety frame 100, a correspondingly greater counterweight 500 may be used to provide stability. Alternatively, the base frame 104 may also be extendible 704 to provide a longer counterbalancing lever arm at the base frame 104 that uses a counterweight 500 of constant mass. Other means of extending a fixed onboard counterweight to provide counterbalancing may also be used, such as a folding arm on the base frame 104 that extends the counterweight 500 but which may be folded up for transport; or a cranked worm screw that slides the counterweight 500 via a threaded hole in the counterweight 500, etc.

Figure 8:
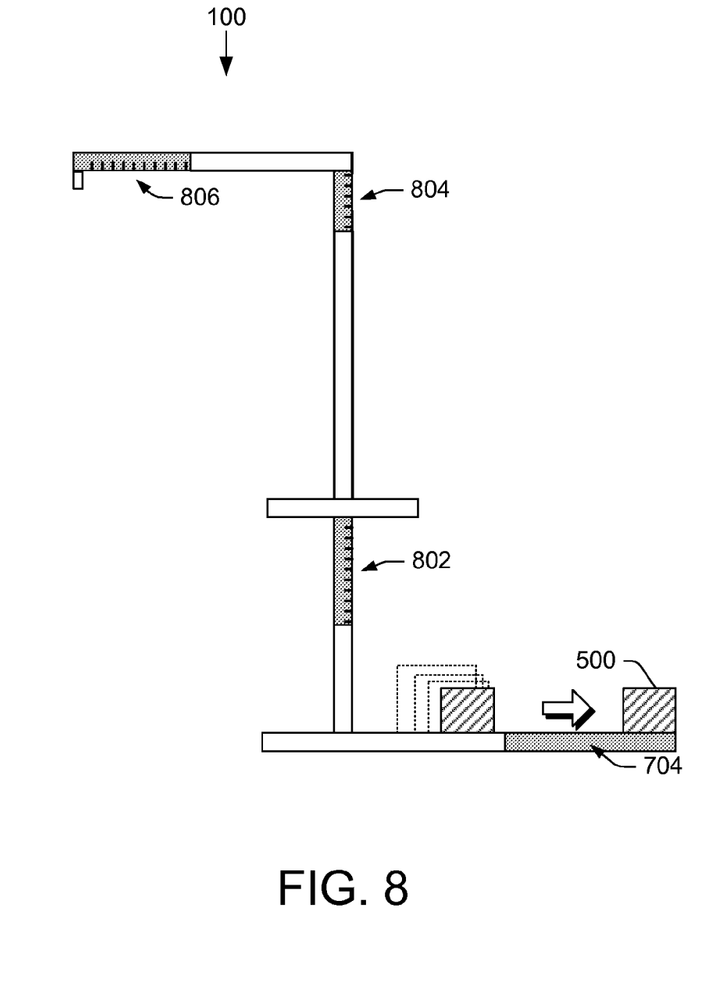
FIG. 8 is a side view of an extendible embodiment of the portable worker safety frame with counterweight indicators.

FIG. 8 shows an extendible embodiment of the portable worker safety frame in which indicators 802, 804, and 806 display the amount of counterweight to use, or alternatively, display an amount of recommended base frame extension 704 with a fixed counterweight 500.

In one implementation, the indicators 802, 804, and 806 each show progressive counterweight masses (or "sizes"). The mass values are revealed by the sliding parts as the associated members of the safety frame 100 are extended further and further. In this implementation, the indicators 802, 804, and 806 each show a separate counterweight mass recommended as a minimum total counterweight mass for the entire portable worker safety frame 100. Thus, whichever displayed mass value is greatest is the amount of counterweight 500 recommended for the entire safety frame 100. So, each adjustment of the walking platform height, the overhead safety rail height, or the overhead safety rail horizontal displacement indicates a corresponding total counterweight size to place on the base frame 104. In a variation, the amount of counterweight recommended is per worker using the frame.

In another implementation, as the members of the portable worker safety frame 100 are extended, the indicators 802, 804, and 806 progressively display respective multipliers, such that the three values indicated are multiplied to obtain a recommended counterweight setting. In yet another implementation, the indicators 802, 804, and 806 progressively display respective counterweight values that are added together to obtain a recommended total counterweight value. The indications of recommended total counterweight, counterweight per worker/load, or base frame extension 704 to increase the counterbalancing lever arm of the base frame 104 can also be displayed by the indicators 802, 804, and 806 via a color coding scheme.

Figure 9:
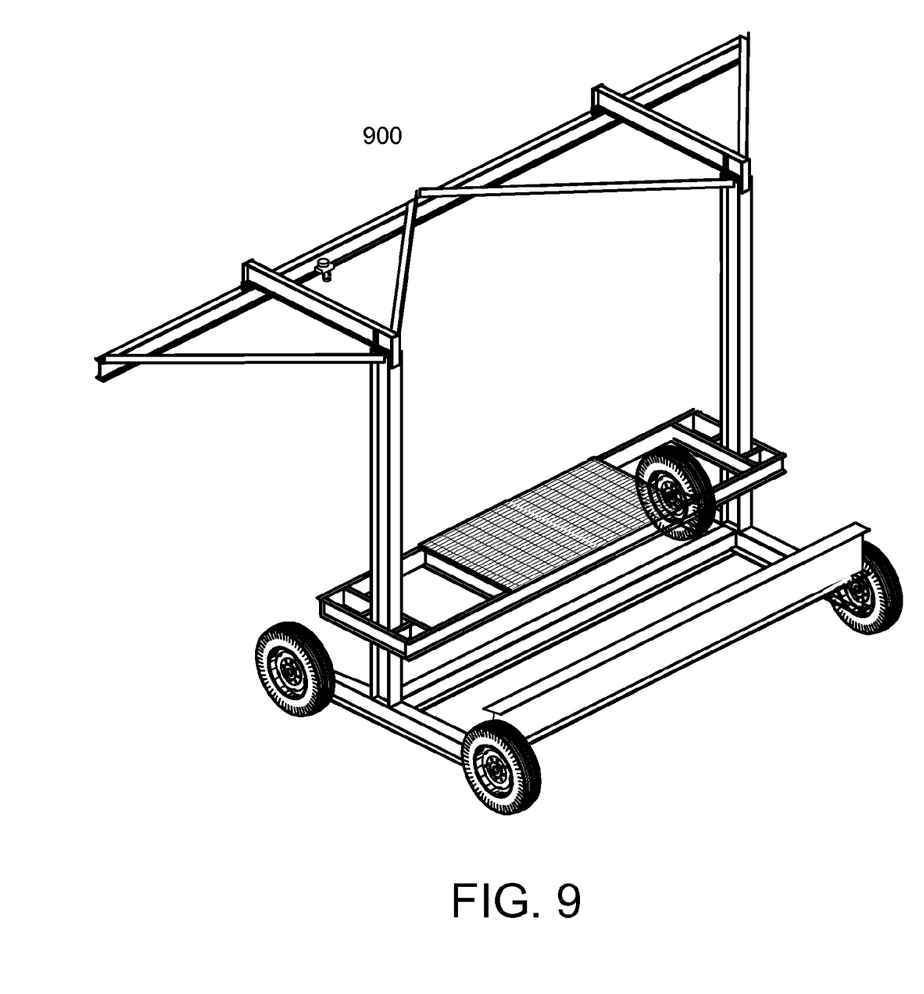
FIG. 9 is an elevation view of a wheeled embodiment of the portable worker safety frame.

FIG. 9 shows an alternate embodiment of the portable worker safety frame 900 in which onboard wheels (motor, etc.) are added to the structure so that the portable worker safety frame 900 can be moved without a lift truck, or even self-propelled. Wheels, castors (not shown), and other rolling devices may be appropriate for smaller versions of the safety frame 900. Versions of the safety frame 100 may also be lifted by crane or other mechanism, in which case the lifting sleeves 108 may be replaced by a hook or other lifting point.

Conclusion

Although exemplary systems have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A portable worker safety frame, comprising:
a base assembly, including:

a base frame for establishing a stable support of the portable worker safety frame on a ground surface;

upright support members secured to the base frame and lying in a vertical plane;

sleeves secured near an edge of the base frame that lies on a first side of the vertical plane, the sleeves suitable for receiving fork tines of a lift truck;

an elongate horizontal walking platform secured to and extending between the upright support members and extending away from the vertical plane on both the first side and an opposite second side of the vertical plane;

an overhead rail assembly for providing attachment of support harnesses to human workers on an arbitrary work surface adjacent to the walking platform, the overhead rail assembly extending generally parallel to the vertical plane and secured via horizontal members to the upright support members on the second opposite side of the vertical plane at a distance that is greater than a maximum distance that the elongate horizontal walking platform extends away from the vertical plane on the opposite second side;

wherein when placed on the ground surface, a structure of the base frame provides strength for supporting workers on the walking platform and workers attached via the overhead rail assembly;

wherein when the portable worker safety frame is being lifted, the base frame possesses a rigidity for maintaining a shape and a structural integrity along an entirety of a length of the portable worker safety frame when supported only by the sleeves;

wherein the portable worker safety frame possesses a center of mass position near a lifting edge of the base frame that enables the base frame to counterbalance a weight of the workers on the walking platform and on the overhead rail assembly;

wherein the center of mass position near the lifting edge is centered between the sleeves and enables the portable worker safety frame to be lifted by the lift truck, wherein the base frame comprises a first longitudinal support member and coplanar end members to form one of an I-shaped support base or an H-shaped support base, further comprising a second longitudinal support member on a lifting side of the portable worker safety frame, the second longitudinal support member adding structural integrity to the base frame and providing a counterweight for stabilizing the walking platform under load and the overhead rail assembly under load, and wherein the walking platform is releasably secured to the upright support members and adjustable with respect to a height distance between the walking platform and the base frame to accommodate various heights of arbitrary work surfaces placed adjacent to the walking platform.

2. The portable worker safety frame of claim 1, wherein the arbitrary work surface adjacent to the walking platform is a cargo bed of a transportation vehicle; and wherein the length of the portable worker safety frame is similar to a length of a flatbed trailer or a length of a flatbed railroad car.

3. The portable worker safety frame of claim 1, wherein a symmetry of the portable worker safety frame with respect to a placement of the sleeves balances the portable worker safety frame when the portable worker safety frame is transported.

* * * * *